May 12, 1959 — R. ASHTON — 2,886,016
HARVESTER AIR INTAKE
Filed Nov. 7, 1956 — 3 Sheets-Sheet 1

INVENTOR.
ROBERT ASHTON
BY James E. Nilles
ATT'Y

May 12, 1959
R. ASHTON
2,886,016
HARVESTER AIR INTAKE
Filed Nov. 7, 1956
3 Sheets-Sheet 2
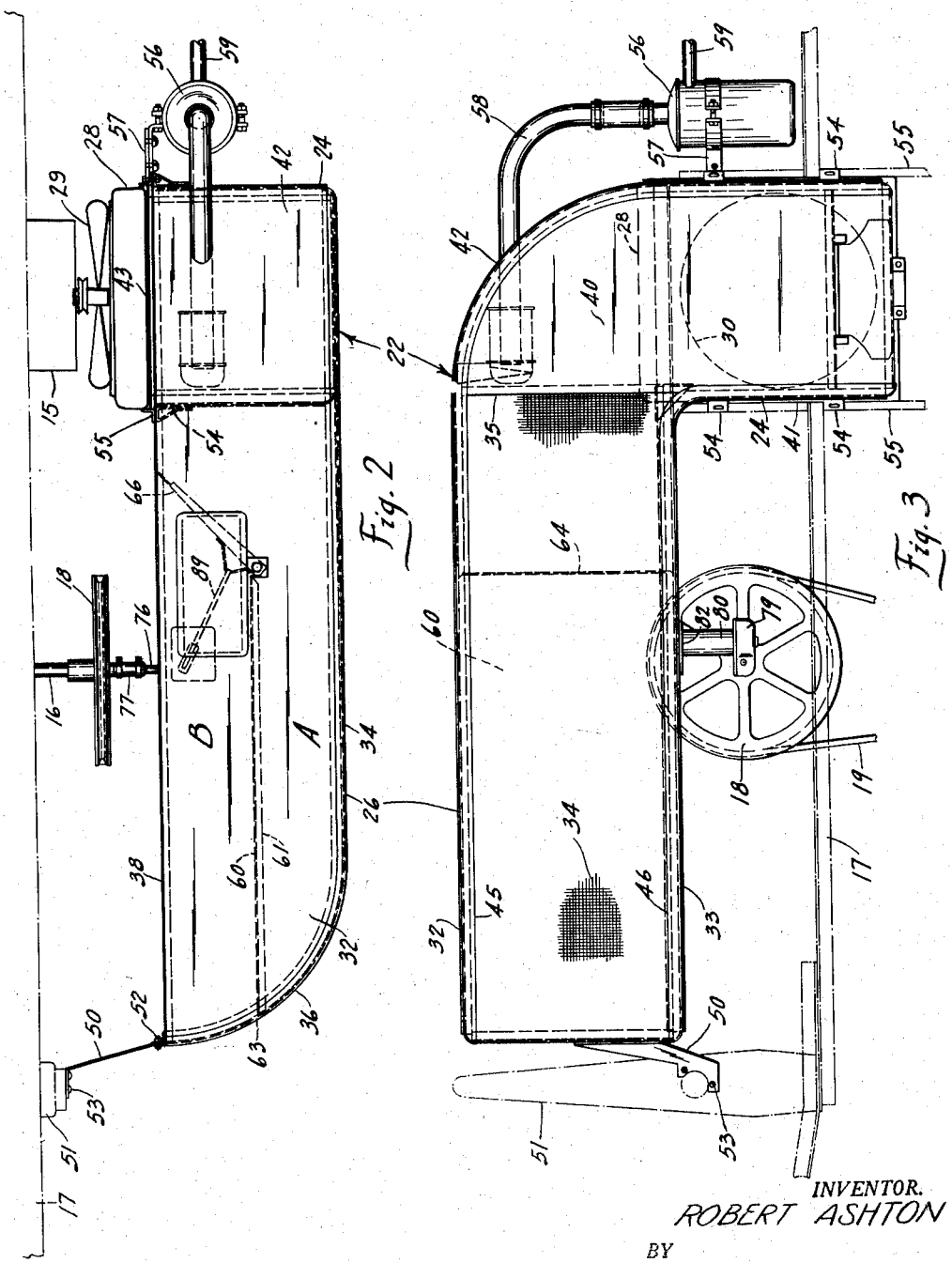
INVENTOR.
ROBERT ASHTON
BY
James E. Nilles
ATT'Y May 12, 1959  R. ASHTON  2,886,016
HARVESTER AIR INTAKE
Filed Nov. 7, 1956  3 Sheets-Sheet 3
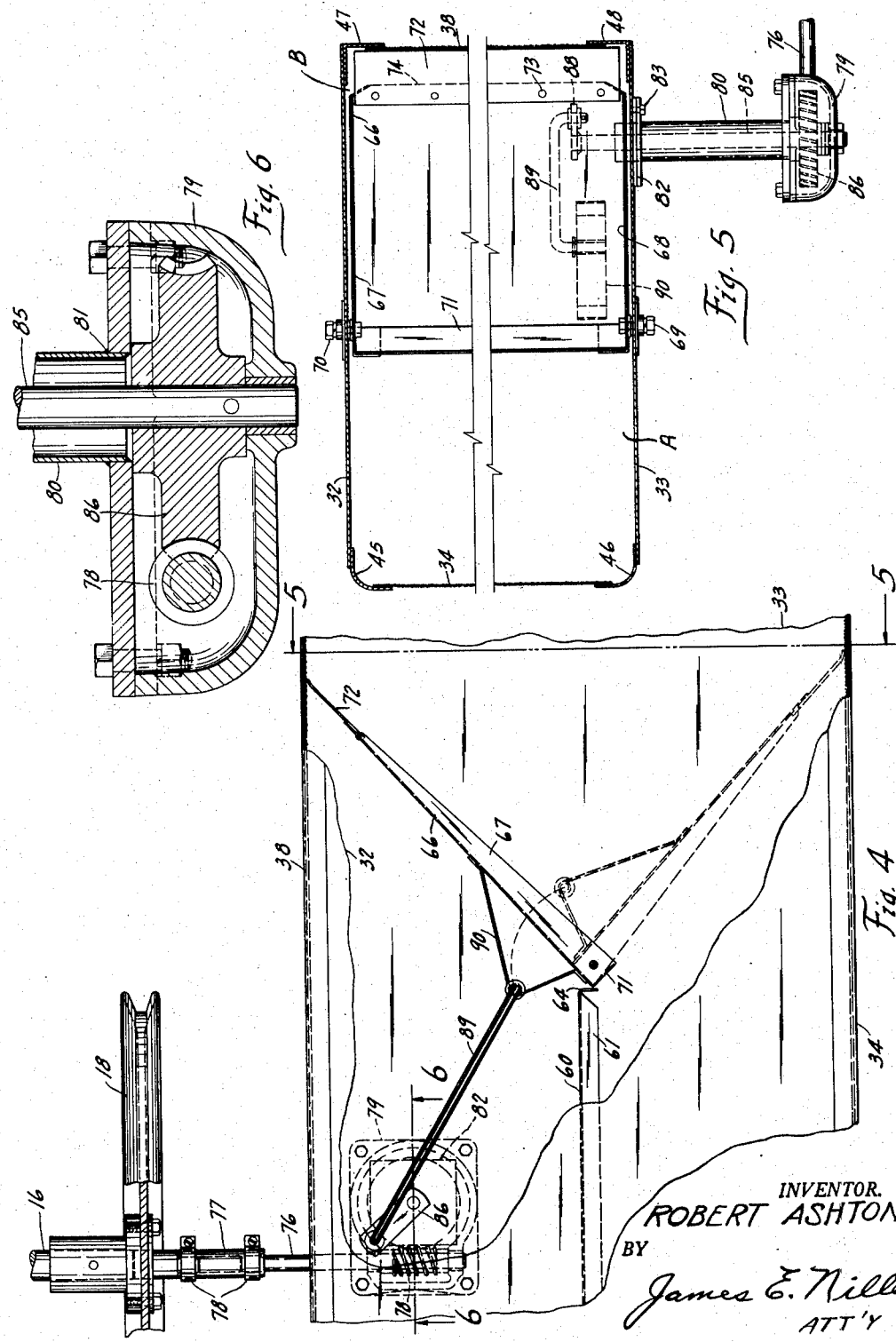
INVENTOR.
ROBERT ASHTON
BY
James E. Nilles
ATT'Y

2,886,016

HARVESTER AIR INTAKE

Robert Ashton, Toronto, Ontario, Canada, assignor to Massey-Ferguson Inc., a corporation of Maryland Application November 7, 1956, Serial No. 620,872

1 Claim. (Cl. 123—41.04)

This invention relates to harvesters which are adapted to pass over a field for harvesting the crop. More particularly the invention pertains to the air intake means through which air is introduced to the radiator of the harvester engine.

An object of this invention is to provide a device for a duct type radiator air intake of a harvester which will keep the screen of the intake free of foreign material so as to facilitate the passage of air therethrough.

More specifically it is an object of the invention to provide a means for periodically breaking the suction on the intake screen of a radiator air intake duct so as to permit the chaff and other foreign material to fall free of the screen.

It is a general object of the invention to provide an improved radiator air intake system for the engine of a harvester.

Other objects and advantages of this invention will become more apparent from the following detailed description and attached sheets of drawings wherein a form of the invention is illustrated. Accordingly the present invention may be considered as comprising the various constructions, combinations, or subcombinations of parts as is hereinafter more fully set forth in the detailed description and in the claim, reference being had to the accompanying drawings in which:

Figure 2 is a plan view of the intake shown in Figure 1, but on an enlarged scale.

Figure 3 is an elevational view of the intake shown in Figure 2.

Figure 4 is a fragmentary plan view, with parts broken away for clarity, of the intake shown in Figure 2, but on an enlarged scale.

Figure 5 is a front elevational view, in section, taken on the line 5—5 of Figure 4.

Figure 6 is an elevational sectional view taken on line 6—6 of Figure 4, but on an enlarged scale.

Figure 1:
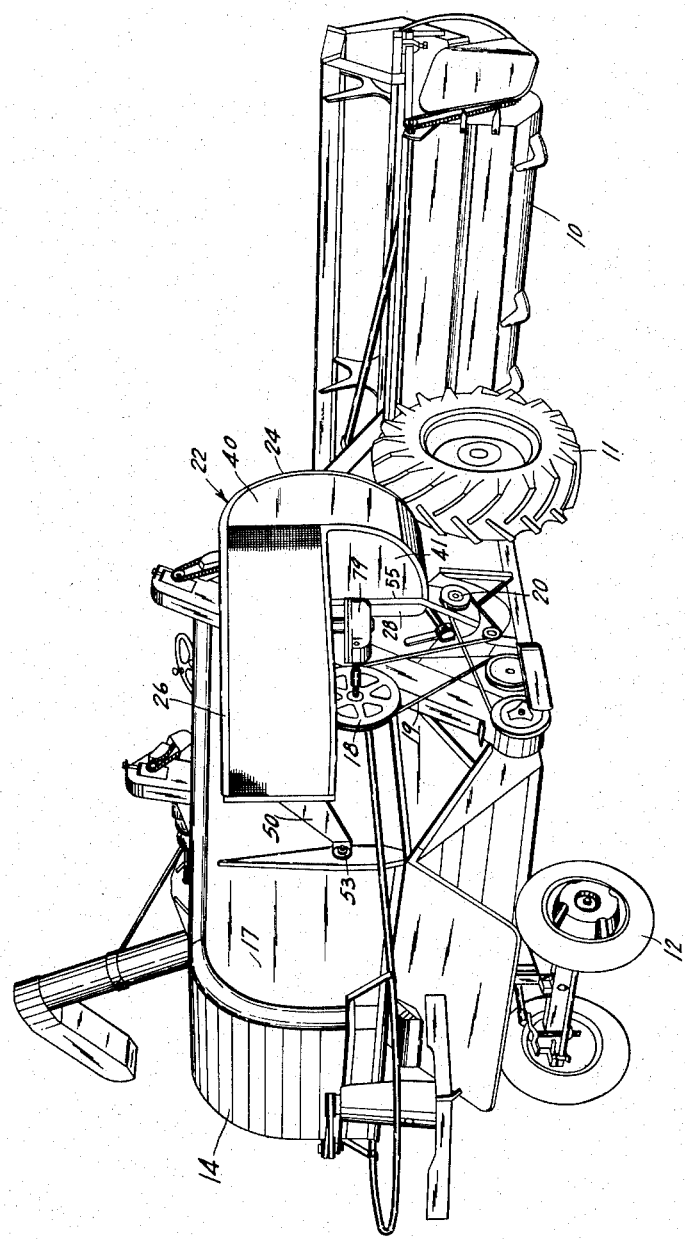
Figure 1 is a perspective view taken from the right, rear side of a harvester embodying an air intake made in accordance with this invention.

Referring in greater detail to the drawings, Figure 1 shows a harvester in the form of a self-propelled combine having a harvesting table 10 at its front end, front traction wheels 11 (only one shown), wheel steering assembly 12 and the combine body 14 which houses the various component parts of the conventional threshing mechanism, including a conventional internal combustion engine 15 which propels the harvester over the ground and drives the various parts of the harvester. A front straw walker shaft 16 extends through the right side 17 of the harvester body and is driven through a large pulley 18 secured thereto. The pulley in turn is driven by a flexible belt 19 which derives its power indirectly through the fanning mill shaft 20 from the engine within the combine body in a conventional and well known manner.

A large air intake member or duct 22 is rigidly secured to the side 17 of the body and is of a generally rectangularly cross-sectional shape having a generally vertical portion 24 and a generally horizontally disposed portion 26 which extends rearwardly alongside the combine body. The overall height of the machine is decreased and the operator's visibility increased by extending the duct rearwardly alongside the body rather than having it extend straight up. However, more foreign matter comes in contact with the intake because of its lower height. The lower end of inner side 43 of the vertical duct portion is open and places the duct in air delivering communication with the engine cooling radiator 28. The radiator is fastened directly to the angle iron frame members 55 of the combine body in any suitable manner, and is located tightly against the duct.

The top 32 and bottom 33 of the horizontal duct portion 26 are formed from solid or unperforated sheet metal. The outer vertical side 34 of duct portion 26 is formed from perforated sheet metal or similar screen material and extends from its junction 35 with the vertical duct portion 24 rearwardly and then curves at 36 to form the rear end of the duct. The inner vertical side 38 of duct portion 26 is also formed from a perforated sheet metal and thus the outer side 34, rear end 36 and inner side 38 are adapted to receive air therethrough and direct it into the duct 22. The vertical duct portion 24 is formed from solid, i.e., unperforated sheet metal and includes the curved outer side 40, rear side 41, the front curved side 42 and inner side 43. Formed corner pieces 45, 46, 47 and 48 (best shown in Fig. 5) are spot welded along their lengths to their adjacent sides to form an integral, rigid duct 22. The duct is secured by a bracket 50 to a roll-formed portion 51 of the body by bolt means 52, 53, and also by brackets 54 which are welded to duct 22 and bolted to the angle iron frame members 55 of the combine body.

A conventional air filter 56 is secured by bracket 57 to the duct and has an intake pipe 58 extending into the duct where it receives air that has been cleaned by passing through the perforated sides of the duct. The filter 56 further purifies the air and delivers it through pipe 59 to the carburetor (not shown). Thus the air passing to the filter has been "pre-cleaned" by the duct.

In operation the radiator fan 29 draws air through the perforated walls of ducts 22, through the radiator 28 and out the rear opening 30 in the radiator casing. The radiator fan creates a considerable suction and a large volume of air is required to cool the engine of a relatively slow moving harvester.

It has been a particularly troublesome problem in the past to keep the air intake screen 34, 38 free of dust, leaves, chaff and other foreign matter and to prevent such material from adhering thereto and building up thereon. As will be appreciated by those working with this type of machinery, this foreign matter quickly builds up on the intake surface 34, 38 so as to necessitate stopping the machine frequently in order to brush the debris off to permit proper functioning of the intake system in cooling of the engine. This type of machine is used in particularly dusty and dirty conditions and the above problem causes considerable "down time" of the machine.

In accordance with the present invention, means are provided for periodically breaking the suction effect of the radiator fan on the air intake screen surfaces, without interrupting the continuous flow of air to the radiator. By this means the foreign matter falls by gravity from the screen as soon as this suction is broken. By periodically permitting the foreign matter to fall free of the screen, it is not given a chance to "build up" and become matted in the screen and difficult to remove therefrom.

The means for accomplishing the above desirable function has been shown, for illustrative purposes, as comprising a vertically arranged sheet metal baffle plate 60 which is secured by its flanges 61 to the top and bottom sides 32, 33 and which extends from its junction 63 with wall 36 to its front edge 64. Thus the baffle divides the horizontal duct portion 26 into two separate compartments A and B for the major portion of its length. Adjacent the front edge 64 of the fixed baffle is pivotally mounted a swingable vertical baffle plate 66 having top and bottom flanges 67, 68 by which it is mounted to top and bottom sides 32, 33 by bolt means 69, 70 respectively. These flanges, together with vertical flange 71, serve to reinforce the swingable baffle plate. A flexible blade member 72 is secured by rivets 73 to the outer edge 74 of the baffle and forms a sealing fit with either side 34, 38 as the baffle is alternately swung between one side and the other. Thus the compartments A and B are alternately sealed off by baffle 66 from the suction effect of the radiator fan and when thus sealed the foreign material drops by gravity from the screen side so sealed. Drive means are provided for swinging the baffle 66 and the power for this means comes from the front straw walker shaft 16. A drive shaft 76 is coupled to shaft 16 by a flexible collar 77 secured to the shafts by drawbands 78. Shaft 76 has a worm gear 78 secured to its outer end and located within the gear housing 79.

The housing 79 is secured to the bottom side 33 by the tubular support 80 which is welded as at 81 (Fig. 6) to the housing and secured by bolt means 83 which extend through a plate 82 made integral with support 80 and through bottom side 33. Another shaft 85 is rotatably mounted in housing 79 as best shown in Fig. 6, and extends upwardly through support 80 and into the duct 22. A pinion gear 86 is rigidly secured to the lower end of shaft 85 and this pinion drivingly meshes with the worm 78. A crank 88 is welded to the upper end of shaft 85. The free end of crank 88 is pivotally connected by rod 89 to the bracket 90 welded to baffle 66. In practice it has been found satisfactory to drive the baffle at a rate of about 5 complete cycles per minute. In other words shaft 85 is driven at about 5 r.p.m.

In operation, as the baffle 66 approaches the side to be sealed the material clinging to the outside thereof begins to drop off. By the time the baffle begins to move away from that side, the suction has been broken for a long enough period of time to permit all of the debris to drop away. By this simple yet effective device, the suction on the intake sides of the ducts is alternately interrupted only long enough to permit gravity to clear the foreign material from the sealed side, without materially reducing beyond tolerable limits the total volume of air delivered to the radiator.

It should be understood that it is not intended to limit the invention to the above described forms and details, and that the invention includes such other forms and modifications as are embraced by the scope of the appended claim.

I claim:

A radiator intake mechanism for a harvester having an engine radiator, means defining a duct having a generally horizontal portion with opposite side walls of screen material and a depending portion secured in air delivering communication with said radiator, a radiator fan for inducing air flow through said duct and said radiator, a fixed vertical baffle plate extending longitudinally of said horizontal portion of the duct and dividing it into two chambers each with a screen wall through which air may be sucked by said fan, a movable baffle plate mounted in the horizontal portion of said duct adjacent the end of said fixed baffle plate nearest the fan to swing about a vertical axis, the free edge of said movable plate being operative to engage the sides of the duct to alternately block off said chambers from the suction effect of said fan, a rotatably driven upright shaft extending into one of said chambers, a crank on said shaft, and a tie rod connecting said crank with said movable baffle plate operative to swing the plate between its alternate positions incident to the rotation of said shaft.

References Cited in the file of this patent

UNITED STATES PATENTS

| | | |
|---|---|---|
| 1,860,697 | Traviss | May 31, 1932 |
| 2,451,227 | Krause | Oct. 12, 1948 |
| 2,455,734 | Clausen | Dec. 7, 1948 |
| 2,612,829 | Joyce | Oct. 7, 1952 |
| 2,783,856 | Krause | Mar. 5, 1957 |